United States Patent
Luthi

[15] 3,658,393
[45] Apr. 25, 1972

[54] HYDROSTATIC BEARINGS

[72] Inventor: Walter Luthi, Zurich, Switzerland
[73] Assignee: Werkzeugmaschinenfabrik Oerlikon-Buhrle AG, Zurich, Switzerland
[22] Filed: Aug. 20, 1970
[21] Appl. No.: 65,489

[52] U.S. Cl. ..................................308/5, 308/9, 308/122
[51] Int. Cl. .......................................................F16c 17/00
[58] Field of Search ....................308/5, 9, 122; 184/5, 100

[56] References Cited

UNITED STATES PATENTS

| | | | |
|---|---|---|---|
| 3,325,229 | 6/1967 | Webb | 308/9 |
| 3,466,951 | 9/1969 | Greenberg | 308/5 |
| 3,333,904 | 8/1967 | Flurscheim et al. | 308/9 |
| 3,407,012 | 10/1968 | Siebers | 308/122 |

Primary Examiner—Martin P. Schwadron
Assistant Examiner—Ronald H. Lazarus
Attorney—Wenderoth, Link & Ponack

[57] ABSTRACT

A hydrostatic bearing having a bearing body positioned between a first and a second part displaceable relative to each other. A guideway is mounted on the second part. The bearing body for the displacement of the first part relative to the second part in a direction perpendicular to the guideway has a piston displaceable in a direction perpendicular to the guideway. Regulating means is provided for regulating the position of the first part with respect to the second part in a direction perpendicular to the guideway in accordance with a predetermined value. A chamber is formed between the bearing body and a part containing a recess and a pipe for pressurized fluid extends to the chamber. The bearing body has on its side opposite the chamber support recesses for supporting the bearing body and bores in the bearing body connect said last named recesses to the chamber. The bearing body has a circular support surface in which the support recesses are each distributed in a quadrant of the circular support surface, and a throttle is connected to the support recesses. The throttle is a screw-threaded bolt screwed into a threaded bore, through the screw thread of which pressurized fluid flows to the support recesses.

3 Claims, 5 Drawing Figures

WALTER LUTHI, Inventor

By. Wenderoth, Lind & Ponack
Attorneys

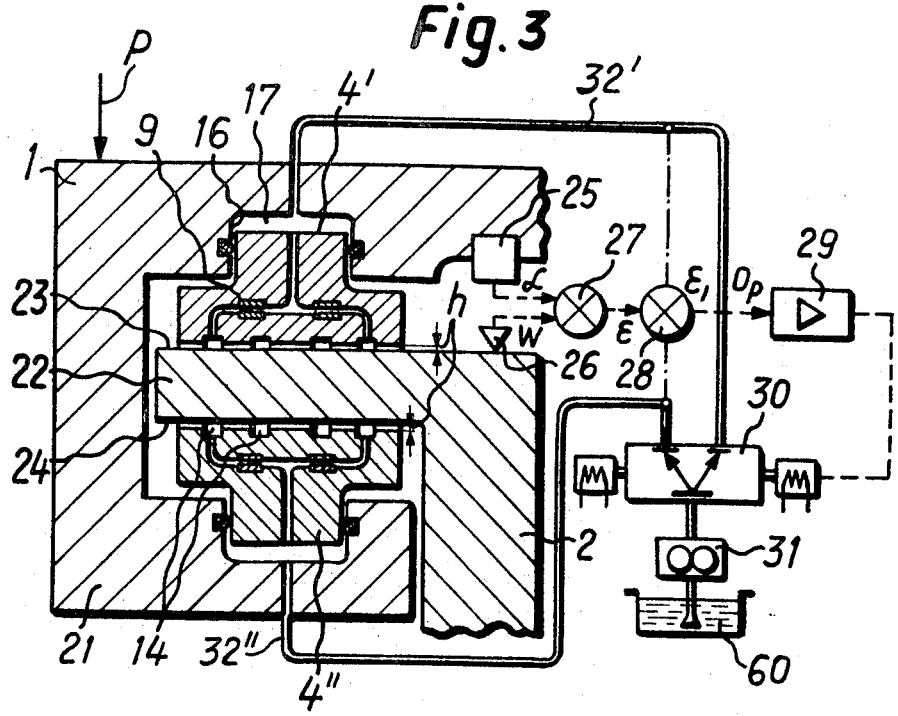
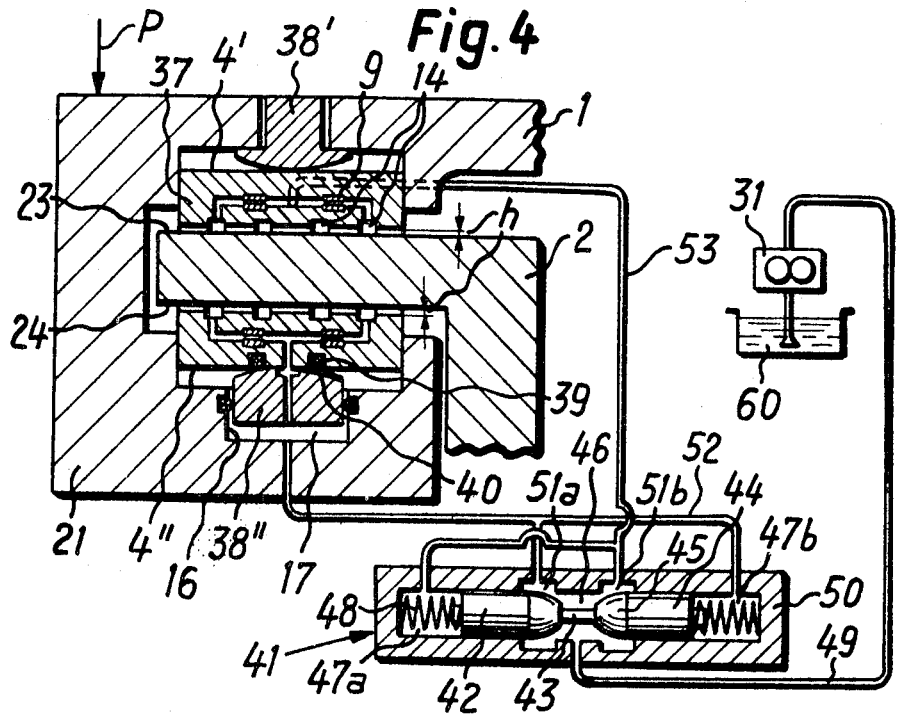

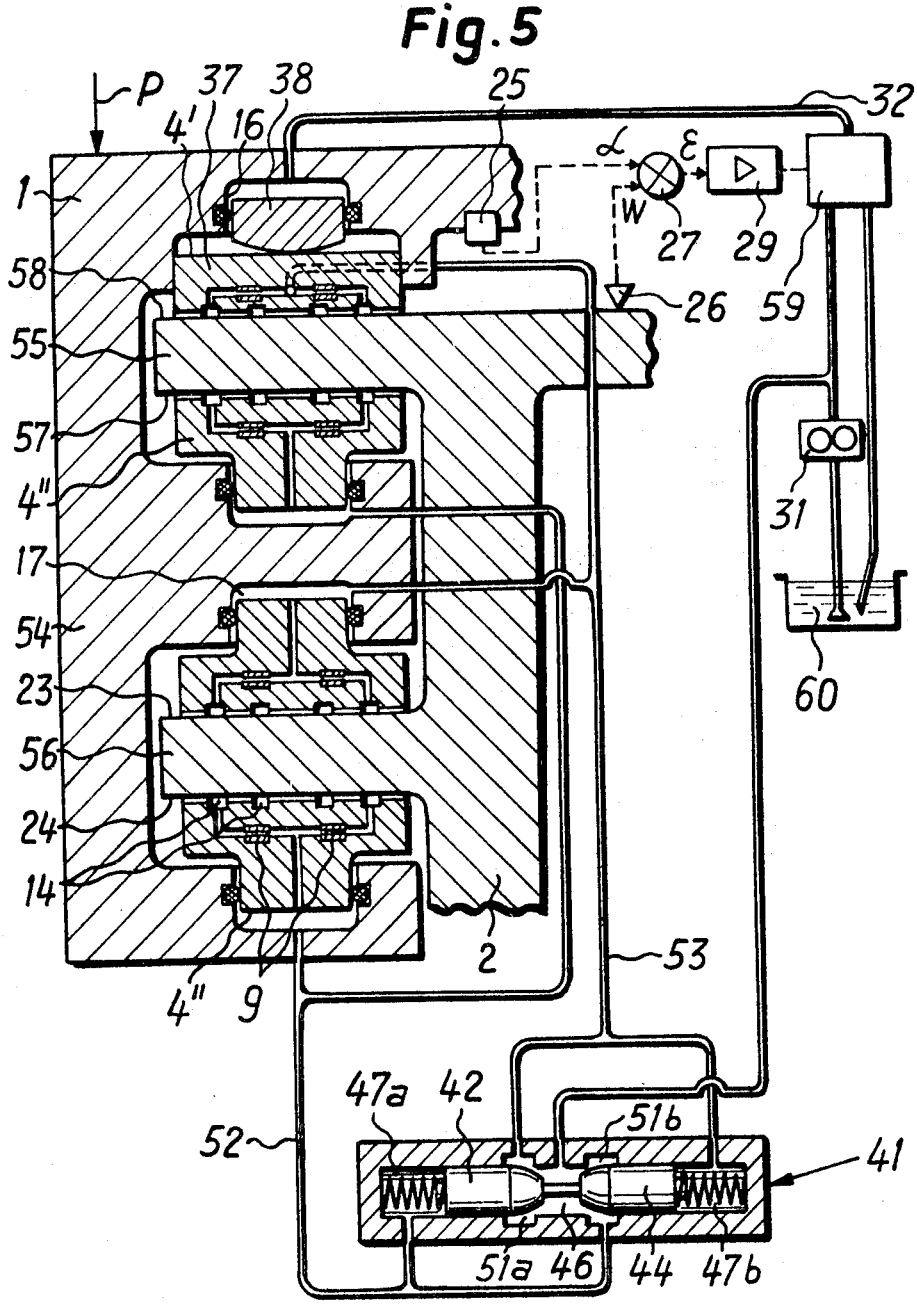

HYDROSTATIC BEARINGS

The invention relates to a hydrostatic bearing including a bearing body positioned between a first and a second part, displaceable relative to each other, said second part including a guideway.

In a known hydrostatic bearing of this kind, two rows of cushions of pressurized fluid are arranged both between the bearing body and the guideway and also between the bearing body and the second part. By connecting any two pressure liquid cushions arranged crosswise, the position of the bearing body is adapted to that of the sliding part. No adjustment of the sliding part at right angles to the guideway is possible in the case of this known hydrostatic bearing, which is found to be a disadvantage if the guideway exhibits irregularities or is totally deformed, or if, in the case of a bearing contacting the second part from above and below a skewing is required to be permitted between the guideway and the sliding part.

It is the aim of the invention to obviate this disadvantage in a hydrostatic bearing.

A hydrostatic bearing according to the invention includes a bearing body positioned between a first and a second part displaceable relative to each other, a guideway situated on said second part, in which for displacement of said first part relative to said second part in a direction perpendicular to said guideway the bearing body includes a piston displaceable in a direction perpendicular to said guideway and there is provided means for regulating the position of said first part with respect to said second part in a direction perpendicular to the guideway in accordance with a predetermined value.

Various embodiments of a hydrostatic bearing according to the invention are described in detail hereinbelow with reference to the accompanying drawings wherein:

FIG. 3 is an example of the application of the hydrostatic bearing illustrated in FIG. 1 with a diagram of the position regulating means;

FIG. 4 shows an example of application of two further forms of construction of a hydrostatic bearing according to the invention with a diagram of an alternative form of position regulating means, and FIG. 5 is an example of application of a further example of a hydrostatic bearing according to the invention with a diagram of a third form of position regulating means.

Figure 1:
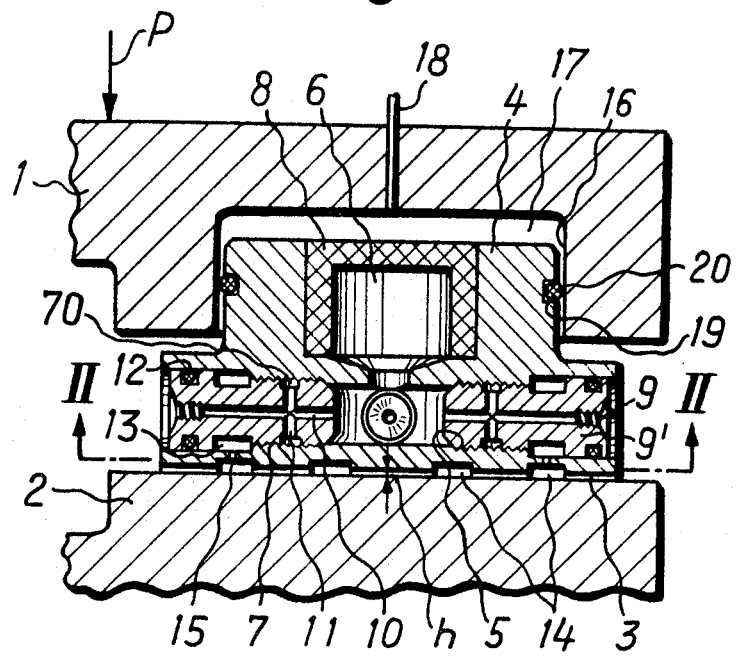
FIG. 1 is a cross section through a first example of a hydrostatic bearing according to the invention.

With reference to FIG. 1 a first part formed by a carriage 1 is supported upon a guideway 3 of a second part formed by a machine frame 2, by means of a bearing body 4. The substantially disc-shaped bearing body 4 has an upper part, of smaller diameter which projects into a cylindrical recess 16 of the carriage 1 and is slidably movable therein to form a piston. On the underside of the bearing body 4, which is located above the guideway 3 of the machine frame 2, are four recesses 14 which when filled with pressurized fluid form supports the shape of which is visible in FIG. 2. Each of the recesses 14 is connected via a bore 15 to an annular space 13 of a throttle 9.

The throttle 9 is formed by a screw-threaded bolt 9'. Two such screw-threaded bolts 9' are screwed into a threaded bore 5 of the bearing body 4. The two screw-threaded bores 5 are at right angles. A central bore 6 is in communication with this threaded bores 5. The bore 6 contains a filter 8 provided for cleaning hydraulic fluid used in the bearing. Into a chamber 17, defined by the recess 16 of the carriage 1 and the upper part of the bearing body 4, there issues a pipe 18 through which hydraulic fluid is fed under pressure. The liquid passes through the filter 8 and enters the threaded bores 5. Each bolt 9' has an axial bore 10 into which a plurality of radial bores 11 issue. Each bore 11 connects an annular groove 70 to the axial bore 10.

From the annular grooves 70 hydraulic fluid can pass through the screw-threads into the annular space 13. Depending upon how far the bolts 9' are screwed into the threaded bore 5, the distance between the annular space 13 and the annular grooves 70 will vary. Thus the number of screw-threads between the annular grooves 70 and the annular space 13, along which the hydraulic fluid must pass, is variable so that the resistance of the throttle is adjustable. From the annular space 13, the fluid passes through the bores 15 into the support recesses 14, from which it is able to escape through the gap $h$ between the bearing body 4 and the guideway 3 of the machine frame 2, and flows via grooves and channels, not shown, back into the oil tank 60 (FIG. 3). In a further annular groove of the screw-threaded bolts 9' there is arranged a sealing ring 12 which prevents egress of fluid from the throttle 9. In addition a sealing ring 20, which seals the chamber 17, is positioned in an annular groove 19 of the bearing body 4.

Figure 2:
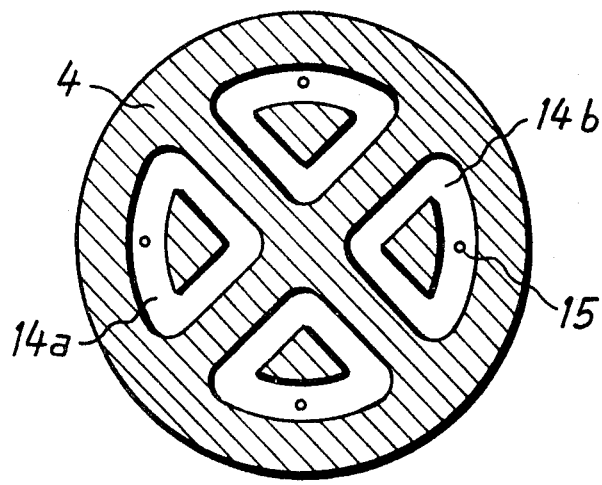
FIG. 2 is a section along the line II—II of FIG. 1 on a smaller scale.

With reference to FIG. 3, two bearing bodies 4' and 4", which are constructed as described with reference to FIGS. 1 and 2, are arranged between the carriage 1 and the machine frame 2, so that the carriage 1 is supported in two opposite directions. The carriage 1 is formed as a U-shaped member 21. A part 22 of the machine frame 2 has upper and a lower guideways 23 and 24, upon which the bearing bodies 4', 4" supported in the carriage 1 slide. The throttles 9 are shown in a simplified manner, but their construction corresponds precisely to the throttles formed by the screw-threaded bolts 9' of FIG. 1. Pressurized fluid is fed to the two bearing bodies 4' and 4" via two pipes 32' and 32" from a servo valve 30 and a pressure fluid source 31. A first measuring element 25 is arranged on the carriage 1, and a second measuring element 26 on a machine frame 2, whereby deviations $\epsilon$ of the position of the carriage 1 with respect to the machine frame 2 are measured. The comparison between a desired value $w$ and an actual value $\alpha$ is made in a comparator element 27. In a second comparator element 28, which is connected to the two pipes 32' and 32", the fluid pressures prevailing in the said two pipes 32' and 32" are compared. In accordance with the pressure difference $\Delta p$ in the two pipes 32' and 32" and the position regulation deviation $\epsilon$ of the carriage 1 with respect to the machine frame 2, the servo valve 30 is controlled via an amplifier 29 so that the fluid pressures in the pipes 32' and 32" are constantly adapted to the loading P of the carriage 1, so that the deviations $\epsilon$ of the actual value alpha from the desired value $w$ are minimized.

In the arrangement illustrated in FIG. 3 the guideway 23 of the machine frame 2 has been used as a reference surface for measuring the deviations $\epsilon$. In the event of this reference surface 3 changing its position under the loading P of the carriage 1, another reference surface independent of the loading of the carriage 1 may be adapted. For example, a light ray preferably a lazer light ray, may also be used as reference standard.

With reference to FIG. 4 the bearing bodies 4' and 4" have a different construction from those illustrated in FIGS. 1 and 3. Each bearing body includes a sliding block 37 which is in contact with a dome-shaped surface of a piston which acts as a support. The bottom sliding block 37 has on the side facing the support piston 38" an annular recess 39 into which a sealing ring 40 is inserted. The support piston 38' in the case of the top bearing body 4' is screwed into a threaded bore of the carriage 1, whereas in the case of the bottom bearing body 4" the support piston 38" is slidably mounted in a recess 16 of the carriage.

The two bearing bodies 4' and 4" are connected to a hydraulic valve 41. The valve 41 includes two pistons 42 and 44 mounted in a cylindrical housing 50. The two pistons 42, 44 are rigidly connected by a bridge 43. Each of the two pistons 42 and 44 has an end portion 45 which tapers towards the bridge 43. In the region of the portion 45 of each piston 42 and 44 there is an annular spaces 51a and 51b in the cylinder housing 50. Between the two annular spaces 51a and 51b there is a chamber 46 into which a fluid pipe 49 issues to which is attached a pressurized fluid source 31. The cross-sectional area of flow for fluid from the chamber 46 into the annular spaces 51a and 51b can be controlled by varying the position of the portions 45 of the pistons 42 and 44. Each of the two pistons 42 and 44 is biased by a spring 48, located in chambers 47a and 47b situated to the rear of the two pistons 42 and 44. Through a pipe 52, the annular space 51a at the piston 42 and the chamber 47b at the piston 44 are connected to the bearing body 4" and through a pipe 53, the annular space 51b, and the chamber 47a are connected to the other bearing body 4'. The pipe 52 issues into a chamber 17 from which fluid passes through a bore in the lower support piston 38" into a bore of the sliding block 37 and from there through the throttles 9 to the recesses 14. The pipe 53 issues directly into a bore in the sliding block 37 of the top bearing body 4' and the liquid passes through the throttles 9 to the recesses 14.

With reference to FIG. 5 the carriage 1 is constructed as a W-shaped member 54. The machine frame 2 includes a top rail 55 with guideways 57, 58 on both sides, and a bottom rail 56 with guideways 23, 24 on both sides. The carriage 1 is supported on the bottom rail 56 by bearing bodies 4', 4" as illustrated in and described with reference to FIGS. 1 to 3. The carriage 1 is also supported from below against the top rail 55 of the machine frame 2 by means of a bearing body 4" as described with reference to FIGS. 1 to 3. The top bearing body 4' on the top rail 55 corresponds to the top bearing body 4' in FIG. 4, with the distinction that the support piston 38 is slidable in the recess 16 and is acted upon by the pressurized fluid.

A pressurized fluid source 31 feeds fluid from an oil tank 60 into the chamber 46 of a valve 41 and through a metering device 59 into the chamber 16 above the support piston of the top bearing body 4'. The valve 41 corresponds to the valve described with reference to FIG. 4. The metering device 59 is actuated by a regulating device as already described with reference to FIG. 3. The top guideway 58 of the top rail 55 of the machine frame 2 serves as reference surface and is sensed by a measuring element 26. The position of the carriage 1 is ascertained by a measuring element 25. The measured values $\alpha$, $w$ ascertained by the measuring elements 25 and 26 are fed to the comparator element 27, which ascertains the deviation $\epsilon$ of the carriage with respect to the medium frame. The deviation $\epsilon$ controls the metering device 59 via an amplifier 29. The supply of pressurized fluid for the sliding block arranged beneath the support piston 38 and for the bottom bearing body 4' occurs via a common pipe 53 which is connected to the left-hand annular chamber 51 in front of the piston 42 and to the chamber 47b to the rear of the piston 44. The supply of pressurized fluid for the two bearing bodies 4" occurs via a common pipe 52 which is connected to the right-hand annular chamber 51b in front of the piston 44 and to the chamber 47a to the rear of the piston 42. The mode of operation of the illustrated hydrostatic bearings according to the invention will now be described.

With reference to FIG. 1 the chamber 17 of the hydrostatic bearing is fed with pressurized fluid via the pipe 18 from a source (not shown) so that a cushion of pressurized fluid is formed between the bearing body 4 and the carriage 1. The pressurized fluid flows through the filter 8 and the central bore 6 into the threaded bore 5, and from there through the axial bores 10 and the radial bores 11 in the screw-threaded bolts 9' into the annular grooves 70. From the annular grooves 70 the fluid is squeezed through the screw-threads 7 into the annular spaces 13 and from there through bores 15 into the support recesses 14. Cushions of pressurized fluid are therefore likewise formed in the support recesses 14. The pressurized liquid is squeezed through the gap $h$ between the bearing body 4 and the machine frame 2 and is collected in a tank (not shown). The carriage 1 is supported on the cushion of pressurized fluid present between itself and the bearing body 4 in the chamber 17, and the bearing body 4 slides in turn upon the cushion present between itself and the machine frame 2.

If an asymmetrical loading of the carriage 1 occurs, as indicated by the vector arrow P in FIG. 1, the bearing body 4 tends to tilt. When tilting occurs, the gap $h$ between the bearing body 4 and the machine frame 2 becomes narrower on one side, and the gap becomes wider on the opposite side. Consequently the liquid pressure increases in the support recess 14a and diminishes in the opposite support recess 14b (FIG. 2). Pressure equalization cannot occur between the two support recesses 14 because the screw-threaded bolts 9' act as throttles. In this manner a moment of reaction is generated by the increased and decreased liquid pressure in the support recesses 14a and 14b respectively, which counteracts the asymmetrical loading and leaves the gap height $h$ unchanged, so that, even in this case, the cushion of fluid present in the gap prevents mutual contact between metallic parts.

With reference to FIG. 3, the carriage 1 is supported via a top and bottom bearing body 4' and 4" respectively on the part 22 of the machine frame 2. The supply of pressurized fluid to the bearing bodies 4', 4" occurs from the source 31 via the servo valve 30 which is controllable so that it increases and reduces respectively the pressure in the pipes 32' and 32" leading to the bearing bodies 4', 4". The said increase and reduction of pressure always occurs in opposite direction in the two pipes, so that a specific pressure differential can be ensured. The servo valve 30 is actuated by the adjusting amplifier of the regulation circuit. The two measuring elements 25 and 26 ascertain the actual value d and the desired value $w$ of the $\alpha$ of the machine carriage 1 and machine frame 2. The position regulation deviation $\epsilon$, which is ascertained by the comparator element 27 from the difference of the desired value $w$ and the actual value $\alpha$, forms the desired value for a subordinate pressure regulation. The actual value of the subordinate pressure regulation constitutes the pressure differential between the two pipes 32' and 32". The pressure regulation deviation, after amplification in the adjusting amplifier 29, actuates the servo valve 30. When a loading of the carriage 1 occurs in the direction of the vector arrow P shown in the drawing, the carriage 1 is displaced slightly downwards. This displacement of the carriage 1 is detected by the measuring element 25. The guideway 23 of the machine frame 2 may be used as a stationary reference surface, so that the desired value $w$ measured on it is invariable. The regulation deviation $\epsilon$ which equals $w$ minus $\alpha$ is then compared with the pressures in the pipes 32', 32", and the pressure regulation deviation resulting from this comparison causes the servo valve 30 to increase the fluid pressure in the pipe 32' and to reduce the fluid pressure in the pipe 32", so that a fluid pressure is attained in the chambers 17 between the bearing bodies 4', 4" and the carriage 1 such that the carriage 1 does not yield to the loading P. The pressure variation is likewise felt in the support recesses 14, so that the gap height $h$ between the guide rail 22 and the bearing bodies 4', 4" likewise remains constant.

The case, just described, of an additional loading of the machine carriage 1, is less important than the case where the guide rail 22 of the machine frame 2 has irregularities or sags completely die to inadequate rigidity. In this case again, the regulation occurs in the manner described and the machine carriage is maintained at constant height in the vertical direction. In this case however the measuring element 26 detecting the desired position value $w$ must respond to an unloaded and invariable reference surface.

With reference to FIG. 4 the carriage 1 is able to tilt with respect to the machine frame 2 in the case of a loading as indicated by the vector arrow P, in which case the support pistons 38', 38" roll with their domed-shaped support surfaces on the sliding block 37. The bottom support piston 38" moves downward with respect to the carriage 1 in the case of such a tilting. In order to facilitate this displacement of the support piston 38", the support recesses 14 in the top sliding block 37 are connected via the pipe 53, and the support recesses 14 in the bottom sliding block 37, and the chamber 17 above the support piston 38" to the valve 41. Due to the loading of the carriage 1, the pressure rises in the pipe 53 and the pressure falls in the pipe 52. Due to these modified pressure conditions, the double piston arrangement 42–44 slides towards the right-hand side, thereby reducing the cross-sectional area of flow between the chamber 46 and the annular chamber 51a and increasing the cross-sectional area of flow between the chamber 46 and the annular chamber 51b. Consequently less pressurized fluid passes into the pipe 52 and more pressurized fluid into the pipe 53, thus reducing the pressure in the bottom support recesses 14 and in the chamber 17 and increasing the pressure in the top support recesses 14, so that the support piston 38″ moves downwards in the case of a tilting motion, and a contact by the top sliding block 37 with the machine frame 2 is prevented.

With reference to FIG. 5 a similar regulating apparatus as illustrated in and described with reference to FIG. 3 is combined with a valve 41 as shown in FIG. 4 in order to render the hydrostatic bearing rigid against fluctuation in loading, and independent of the geometrical constitution of the guideway. The regulating apparatus comprises a simple positioned regulation circuit. The subordinate pressure regulation circuit has been omitted in this case. The measuring element 26 detects the desired position value $w$ at the machine frame 2 or at a suitable reference surface, and the measuring element 25 detects the actual position value $\alpha$ at the carriage 1. The two values $w$ and $\alpha$ are compared in the comparator element 27. The position regulation deviation $\epsilon$, via the adjusting amplifier 29, controls the metering device 59 which, depending upon the sign of the regulation deviation, increases or reduces the supply of pressurized fluid into the chamber 17 above the support piston 38. Assuming an additional loading of the carriage 1 in the direction of the vector arrow P shown in the drawing, the fluid pressure in the chambers 17 and support recesses 14 in the respectively upper bearing bodies 4′ increases and the fluid pressure in the respectively lower bearing bodies 4″ decreases.

The loading P of the carriage generates a pressure increase in the chamber 17 and in the support recesses 14, which are connected to the pipe 53. Conversely, the pressure in the chambers 17 and support recesses 14 which are connected to the pipe 52 diminished. The pressures in the pipes 52, 53 which are connected to the valve 41 cause a displacement of the pistons 42-44 towards the left-hand side. By this means the cross-sectional area of flow are modified so that the flow rate through the pipe 53 is increased and the flow rate through the pipe 52 is reduced, thereby counteracting a downward displacement of the carriage 1.

The tendency of the carriage 1 to move downwards — irrespectively of whether it originates from an additional loading of the carriage or from an irregularity in the guideway — is additionally detected by the position regulation circuit, and the position regulation deviation controls the metering device 59 in that the fluid pressure in the chamber 17 above the support piston 38 is increased, causing the carriage to maintain its position in the vertical direction.

I claim:

1. A hydrostatic sliding bearing comprising a guideway, a bearing body that can be shifted in a predetermined direction on said guideway; a machine part supported on said guideway by said bearing body, a cylinder and a piston on said machine part and on said bearing body, said piston being movable in said cylinder for shifting said machine part in relation to said bearing body in a direction perpendicular to said guideway, a reference surface parallel to said guideway for determining the position of said machine part, a measuring member for measuring the actual distance between said machine part and said reference surface, a comparison member for comparing the actual distance to a desired distance, a pump for supplying fluid into said cylinder and a valve between said pump and said cylinder controlled by said comparison member.

2. A hydrostatic sliding bearing as set forth in claim 1 wherein said machine part has a recess for guiding said bearing body in a sealing manner, a chamber between said bearing body and said machine part, a hydraulic pressure fluid line leading to said chamber, said bearing body having supporting carrying pockets on the side opposite to said chamber, said pockets being connected to said chamber by bores in said bearing body, a circular supporting surface on said bearing body wherein said supporting pockets are arranged in four quadrants, a tapped bore in said bearing body for each pocket, a threaded bolt screwed into each tapped bore so that said threaded bolts act as restrictors with the hydraulic fluid flowing between said chamber and said bearing pockets through the threads of said bolts.

3. A hydrostatic sliding bearing as set forth in claim 1, comprising a portion of said machine part surrounding said guideway, an upper and a lower bearing body between said machine part and said guideway, a chamber in each case between said bearing body and said machine part, a hydraulic fluid line leading in each case to each of said chambers, a servo valve connected into said two hydraulic pressure fluid lines and a second comparison member controlling said servovalve, which second comparison member the pressure difference in said two hydraulic fluid lines being supplied as the actual value and the position deviation determined by said first-named comparison member as the desired required value.

* * * * *